Figure 5A:
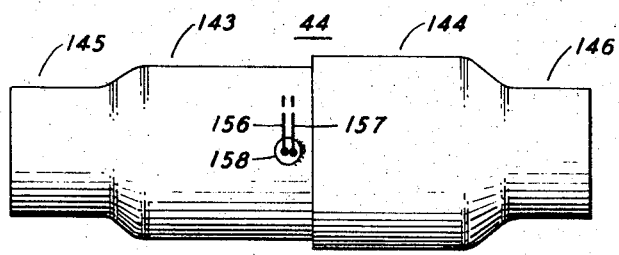
Figure 5D:
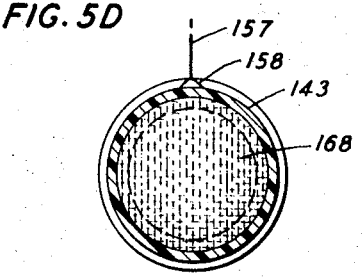

United States Patent

[11] 3,577,984

[72] Inventors Donald Levy
 Spring Valley;
 Tibor Rusz, Sparkill, N.Y.
[21] Appl. No. 626,240
[22] Filed Mar. 27, 1967
[45] Patented May 11, 1971
[73] Assignee Donti Research Development
 Manufacturing
 Hackensack, N.J.

[54] SPIROMETER
 29 Claims, 9 Drawing Figs.
[52] U.S. Cl. .................................................... 128/2.08,
 73/195
[51] Int. Cl. .................................................... A61b 5/08
[50] Field of Search ......................................... 73/194,
 227, 195, 198; 128/207, 208, 2.1 (Electr. Recp.
 Digest), 2, 2.05 (MT), 45.5

[56] References Cited
UNITED STATES PATENTS
3,316,902  5/1967  Winchel et al. ...............  128/145.5
OTHER REFERENCES
Krobath et al.," American Journal of Medical Electronics,"
Apr.-June, 1964, pp. 105— 109, copy in 128/z.08

Primary Examiner—William E. Kamm
Attorney—Frederick W. Padden

ABSTRACT: An electronic spirometer is disclosed for measuring a plurality of airflow and air volume parameters of a patient. A resistance measurement bridge having a transducer with a heated platinum wire is used to measure airflow. A detector network detects and stores the peak airflow. A linearizing network and a sequence and storage circuit convert the measured airflow into volume signals during successive intervals of a measurement cycle. A meter circuit is selectively controlled by the peak detector network and the storage circuit as well as the linearizing network and an averaging resistance capacitor arrangement for providing indications of the measured airflow and volumes.

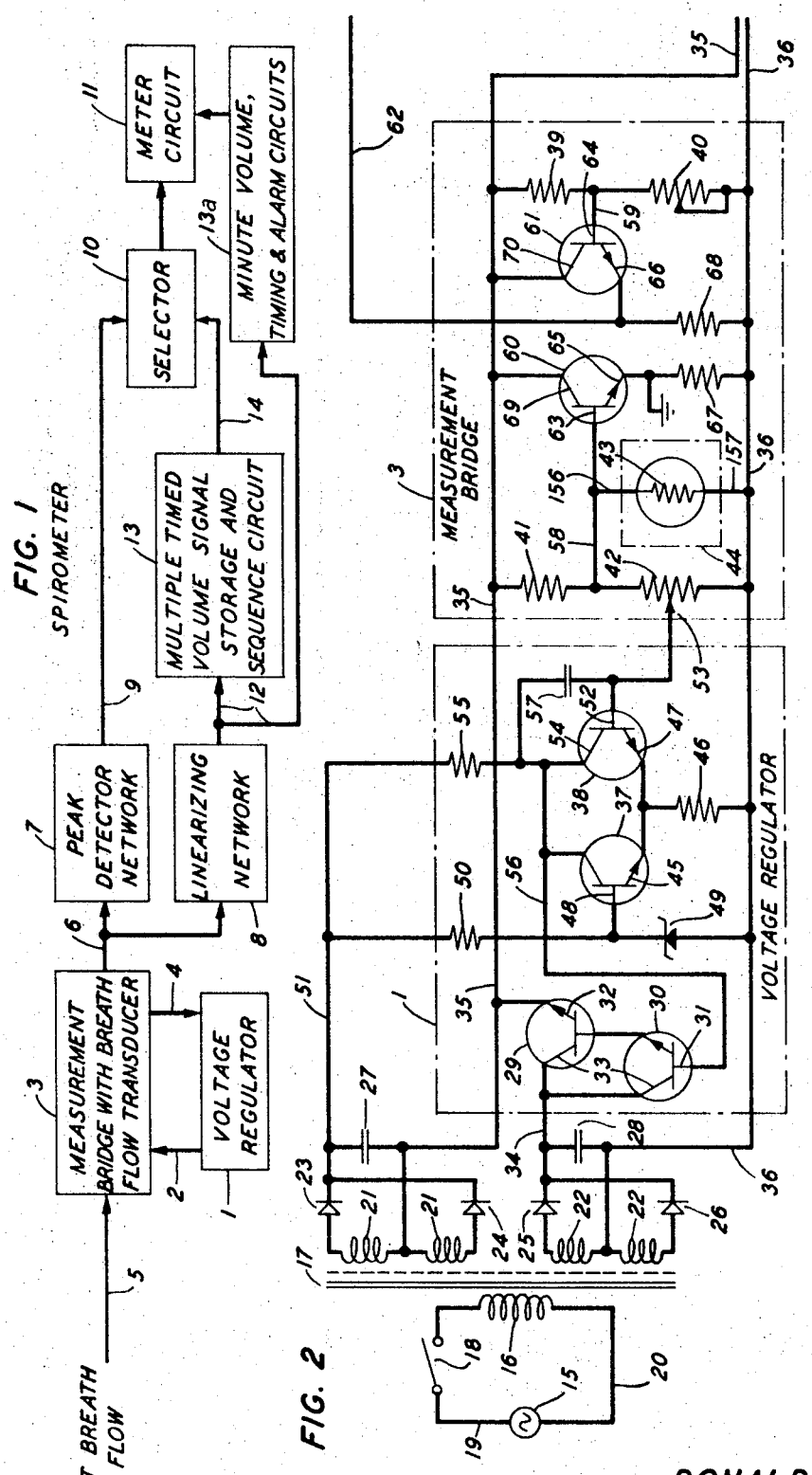

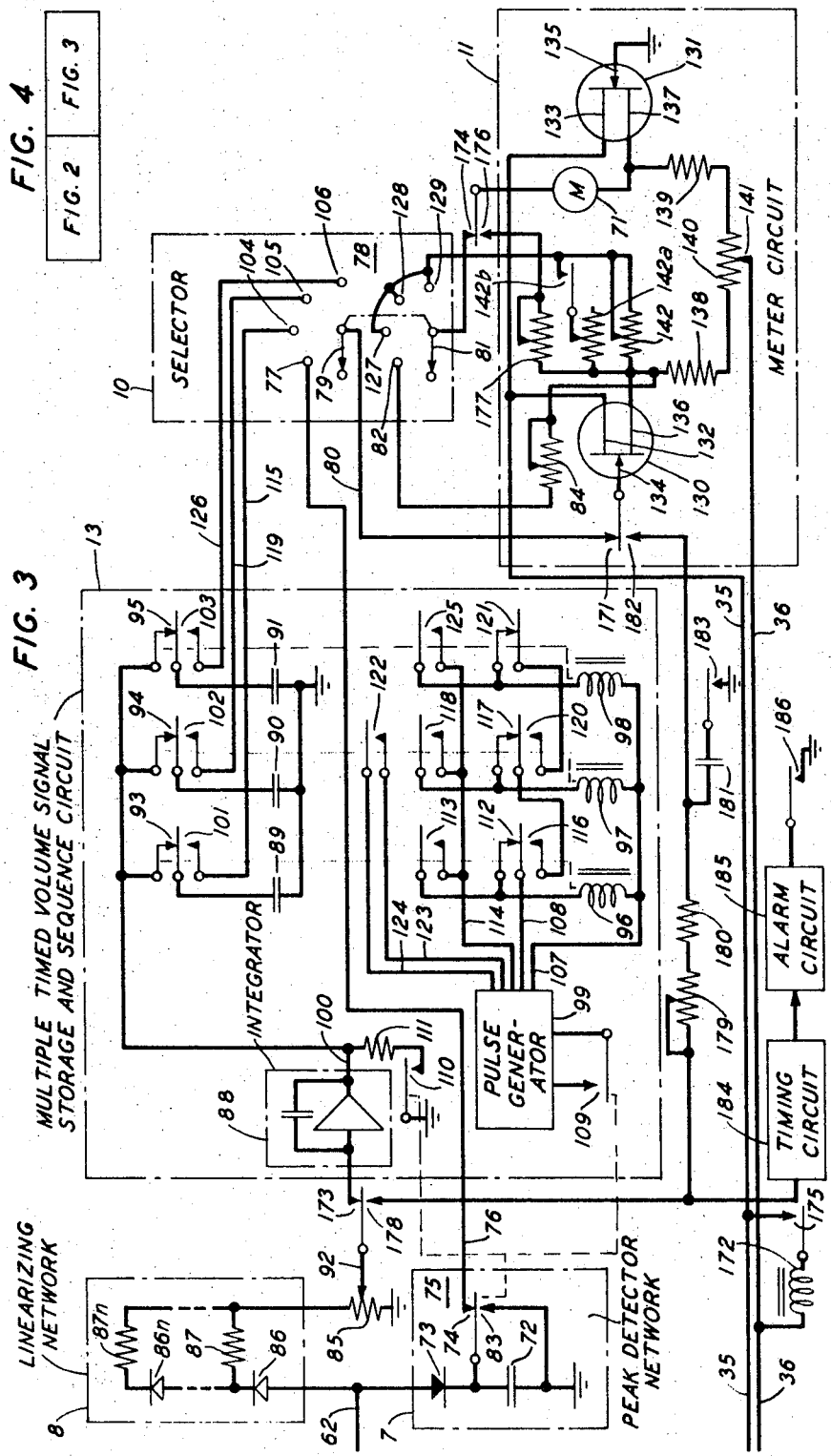

PATENTED MAY 11 1971 3,577,984

SHEET 3 OF 3

INVENTORS: DONALD LEVY
TIBOR RUSZ

BY
*Frederick W. Padden*
ATTORNEY

SPIROMETER

This invention relates to equipment for measuring the flow of air and particularly to spirometer facilities for measuring the peak flow and volumes of air expelled by a patient during a plurality of discrete intervals in a predetermined respiratory period.

The development of spirometer instruments for analyzing respiratory parameters has progressed in recent years to the extent that mechanical, electromechanical and electronic systems as well as water displacement systems are currently available to produce breathing information which aids in evaluating the health of a patient. Each of these systems is customarily arranged to measure a variety of respiratory parameters including minute volume, tidal volume, vital capacity, forced vital capacity, forced expiratory volume, and peak flow.

Prior art spirometers have proven too complicated, bulky and costly to warrant their widespread use in evaluating pulmonary and collateral health conditions of a patient. In addition, the accuracy of spirometer measurements have generally been dependent upon frequent, burdensome and time consuming alignment and maintenance procedures. Another deficiency inherent in prior art spirometers is that no facilities have heretofore been provided for rapidly indicating the peak flow and maximum airflow during prescribed intervals of a measurement cycle and immediately after the completion of the cycle. The determination of such data is usually dependent upon the interpretation of graphically recorded information.

In view of the foregoing, an object of this invention is to provide simple and economical facilities for accurately measuring airflow and volume.

It is another object to provide an improved spirometer and particularly one that accurately measures airflow, volumes and peaks during a respiratory cycle.

Another object is to provide simple spirometer alignment and maintenance procedures.

A further object is to provide facilities for accurately indicating desired parameters of spirometer measurements immediately after a measurement cycle.

The foregoing and other objects are attained in accordance with a specific illustrative embodiment of this invention in which a simple, compact and economical spirometer is provided for measuring a patient's expelled respiration including minute volume as well as tidal volume, vital capacity, forced vital capacity, forced expiratory volume and percentages of such parameters in discrete time intervals of a measurement cycle. The spirometer also measures the peak airflow during a measurement cycle. The instrument is arranged to store the desired parameters during discrete intervals of a measurement cycle and to indicate the stored parameters immediately after the completion of the cycle without the need for interpreting graphic information. A salient feature of the spirometer is the provision of an airflow transducer comprising a disposable mouthpiece through which a patient comfortably breathes air to be measured. The transducer includes a platinum wire which is electrically heated by a constant voltage for furnishing a prescribed electrical resistance in a resistive measurement bridge. Air or gases breathed into the transducer cools the platinum wire for lowering its electrical resistance. A transistor voltage regulator is responsive to the resistance changes in the transducer wire for supplying regulated voltages so that the constant voltage is maintained for heating the wire and appropriate bridge output signals are supplied for the measured airflow.

A peak detector network having a diode and a storage capacitor receives and stores the bridge output signals corresponding to the peak airflow through the transducer during a measurement cycle. The output signals of the bridge are nonlinear with respect to the airflow through the transducer. Consequently, the present invention utilizes a linearizing network including a configuration of diodes and resistors for converting the bridge output signals into linear signals with respect to transducer airflow.

A storage and sequence circuit is furnished in the spirometer for sequentially storing a plurality of distinct air volume signals. In the exemplary embodiment, the circuit comprises an integration amplifier which is responsive to the linearized signals for charging a set of three capacitors to store signals indicative of the volumes of airflow through the transducer. The sequence circuitry includes a pulse generator which is operative at the start of a measurement cycle to generate pulses at 1, 2 and 15 second intervals for sequentially operating a group of relays. These relays successively disconnect the integration amplifier from a first one of the charged capacitors at the end of 1 second, a second charged capacitor at the end of 2 seconds, and the last capacitor at the end of 15 seconds. Each of these charged capacitors is connected through relay contacts to a selector switch which is selectively operable after a measurement cycle for extending the three charged capacitors and the charged capacitor in the peak detector network to a meter circuit. The latter includes a meter and a pair of field-effect transistors which are biased by the signals stored on the charged capacitors for energizing the meter to provide indications of the measured volumes of airflow through the transducer and immediately after a measurement cycle by merely activating the selector switch to different designated positions. The meter indications advantageously may be in liters and percentages for volume measurements and liters per minute for peak airflow measurements.

Circuitry is also provided for measuring and indicating the minute volume of airflow through the transducer. This parameter is basically the air volume expired or inspired during a minute interval. The circuit includes a relay switch for disconnecting the aforementioned storage and sequence circuit from the linearizing network and connecting the output of that network to the meter circuit via a long time constant resistance-capacitor arrangement. The latter translates the linearized signals into an average voltage which is selectively applied to the field-effect transistors in the meter circuit under control of the relay switch for energizing the meter to furnish indications of the minute volume of airflow through the transducer. A rheostat is included in the resistance-capacitor arrangement for adjusting the time constant of the averaging circuitry to determine the meter speed of response to breathed air flowing through the transducer.

Timing and alarm circuits are also provided which monitor the output of the linearizing network and provide an alarm indication whenever a desired airflow through the transducer is interrupted for longer than a prescribed time interval.

Figure 5C:
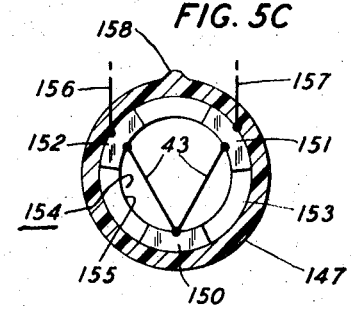
Figure 5B:
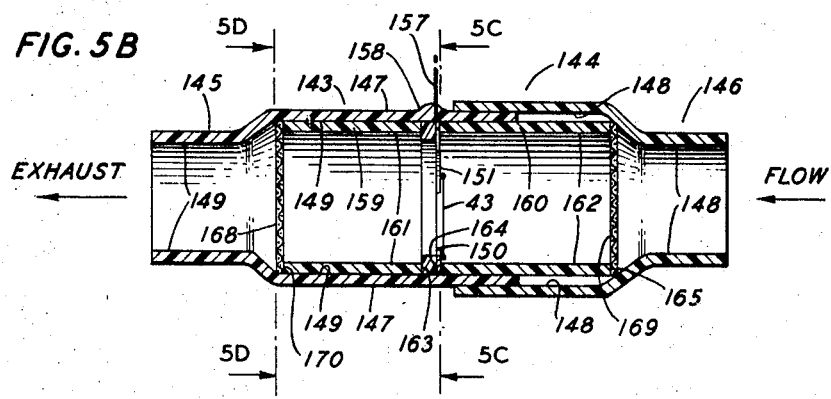
Figure 6:
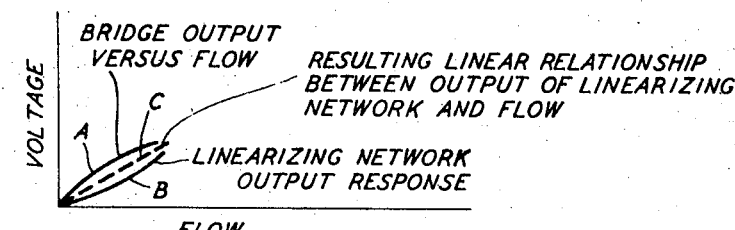

The foregoing and other objects, features and advantages of the present invention will be more clearly understood from a reading of the following description of an illustrative embodiment thereof with reference to the drawing in which:

FIG. 1 is a block diagram showing the interrelation of the functional elements of the spirometer equipment according to the exemplary embodiment of the instant invention;

FIGS. 2 and 3 schematically depict the circuit and apparatus of a specific exemplary spirometer according to this invention;

FIG. 4 shows the position in which FIGS. 2 and 3 may be placed to illustrate the circuit interconnections;

FIGS. 5A—5D are structural views of a breath airflow transducer for use with the spirometer of FIGS. 2 and 3; and FIG. 6 shows graphically the response curves of the voltage outputs versus airflow for the measurement bridge of FIG. 2 and the linearizing network of FIG. 3.

Referring to FIG. 1, spirometer equipment is shown for measuring and indicating a variety of airflow parameters. The equipment comprises a voltage regulator 1 which supplies regulated voltages over conductor 2 to a measurement bridge 3. According to the present invention, the bridge 3 advantageously includes a transducer which cooperates with the regulator 1 over conductor 4 to control the balance of bridge 3 and to translate an input breath airflow 5 into output voltages on the conductor 6. Such output voltages are applied to both a peak detector network 7 and a linearizing network 8.

The network 7 detects and stores the voltage signal corresponding to the peak airflow through the bridge transducer during an airflow measurement cycle. The stored signal is connected over conductor 9 to the selector 10 for subsequent application to meter circuit 11.

The output voltages of bridge 3 are nonlinear with respect to airflow through its transducer. According to the present invention, network 8 is advantageously used to convert the nonlinear output voltages on conductor 6 into voltages on conductor 12 which are linear with regard to the airflow through the bridge transducer. The latter voltages are selectively applied to the multiple timed volume signal storage and sequence circuit 13 which translates the linearized airflow voltages into exhaled air volume voltages. It also generates a plurality of measurement intervals within an airflow measurement cycle and is responsive to the volume voltages for sequentially storing a plurality of discrete air volume signals on individual storage devices during each generated interval. In addition, circuit 13 includes switching facilities for connecting the stored volume signals over leads 14 to the selector 10 for selective connection to meter circuit 11. Selector 10 connects the meter circuit 11 to the peak detector network 7 for translating a stored peak airflow signal into an indication of the magnitude of that flow. Similarly, selector 10 connects meter circuit 11 to the volume storage devices of circuit 13 over conductors 14 for successively translating each of the stored air volume signals into meter indications of the magnitudes of the respective air volumes measured during each of the generated measurement intervals.

The linearized airflow voltages produced on lead 12 by the linearizing network 8 are also selectively applied to the minute volume, timing and alarm circuits 13a. The minute volume circuitry includes meter calibrating apparatus and a relay switch for selectively connecting the linearized voltages on lead 12 through a resistance-capacitor arrangement to the field-effect transistors of meter circuit 11. The latter arrangement averages the linearized voltages and causes the meter circuit 11 to provide indications of the minute volume of airflow through the transducer of measurement bridge 3. Timing and alarm facilities are furnished in the circuits 13a for monitoring the linearized output signals produced by network 8 on conductor 12 during the minute volume measurements and for supplying alarm signals when a desired airflow is not detected within a prescribed time interval.

Turning now to FIGS. 2 and 3, a detailed description is presented of the spirometer circuitry. The power for operating the spirometer is supplied by the AC (alternating current) source 15 which is connected to the primary winding 16 of power transformer 17 via the ON-OFF switch 18 and leads 19 and 20. The closure of switch 18 completes a circuit for applying the AC power to transformer 17 and thereby defining the ON state of the spirometer. As a result, AC is coupled by transformer action to each of the secondary windings 21 and 22 of transformer 17. The diodes 23, 24, 25, and 26 form part of full-wave rectifiers for converting the AC induced in the center-tapped windings 21 and 22 into DC (direct current) voltages for operating the associated transistor voltage regulator 1. Capacitors 27 and 28 are used for filtering the rectified AC.

In regulator 1, the NPN transistors 29 and 30 are arranged in a well known Darlington configuration for stabilizing the combined gain of the transistors independently of ambient temperature changes and variations in the gain of the individual transistors. The transistors 29 and 30 may be referred to as having effectively a single base electrode 31, emitter electrode 32 and collector electrode 33. The collector 33 is connected to the positive DC voltage supplied to conductor 34 by the full-wave rectifier. Emitter 32 is connected over conductor 35 through branch resistances of the measurement bridge 3 to the negative DC voltage supplied on conductor 36 by the full-wave rectifier for forward biasing the emitter 32 and base 31 junctions in cooperation with the NPN transistors 37 and 38. The latter resistances include resistor 39 and rheostat 40 in one bridge branch and resistor 41, potentiometer 42 and a resistance 43 of a transducer 44 in another bridge branch. As a result, transistors 29 and 30 function as an emitter follower which supplies a regulated voltage on conductor 35 and particularly across the transducer resistance 43 under control of the transistors 37 and 38.

The transistors 37 and 38 comprise part of a differential amplifier for automatically regulating the bias on the base 31 to emitter 32 junctions of transistors 29 and 30 whenever DC voltage changes occur in the voltage of power source 15 or as a result of transducer resistance 43 variations during airflow measurements. Transistor 37 functions as an emitter follower and supplies a fixed reference voltage at its emitter electrode 45 and across resistor 46 for biasing the emitter electrode 47 of transistor 38. The base electrode 48 of transistor 37 derives the reference voltage across Zener diode 49 which is part of a voltage divider including resistor 50 connected between the negative DC voltage on conductor 36 and the positive DC voltage on conductor 51. Diode 49 thus operates in its Zener region and supplies a substantially constant reference voltage which is reproduced at the emitters 45 and 47. A prescribed bias voltage for the base electrode 52 of transistor 38 is obtained from the wiper 53 of potentiometer 42 in bridge 3. Potentiometer 42 is connected in parallel with the transducer resistance 43 and in series with resistor 41 of bridge 3. The voltage available at wiper 53 is more positive than that at emitter 47. As a result, the emitter 47 and base 52 junction of transistor 38 is forward biased to provide an amplified output voltage at its collector electrode 54 and across resistor 55 which is applied over conductor 56 to the effective base 31 of transistors 30 and 29. The bias voltages thus applied to transistors 29 and 30 control their conduction so that they function as a series regulator to maintain a substantially constant voltage across transducer resistance 43. A capacitor 57 is connected between the base 52 and collector 54 for decoupling voltage transients.

As mentioned, the measurement bridge 3 comprises two branches. One includes the resistor 39 and the bridge calibrating rheostat 40 and the other comprises the resistor 41, potentiometer 42 and transducer resistance 43. Output signals from the branches are derived on conductors 58 and 59. These signals are applied to the respective emitter follower amplifiers including the NPN transistors 60 and 61 which, in turn, supply output flow measurement signals to both the peak detector network 7 and linearizing network 8 of FIG. 1. Transistors 60 and 61 comprise respective base electrodes 63 and 64 which receive the branch output signals from conductors 58 and 59. The emitter electrodes 65 and 66 are connected through resistors 67 and 68 to the negative DC voltage on conductor 36. The collector electrodes 69 and 70 of transistors 60 and 61 are connected to the positive DC voltage on conductor 35. Transistor 60 functions as an emitter follower whereby the constant voltage maintained across transducer resistance 43 is substantially repeated at the emitter 65 and across resistor 67. Accordingly, the potential at emitter 65 is designated as the reference ground potential for the circuitry of FIG. 3. Transistor 61 also functions as an emitter follower to couple the changeable output flow measurement signals from conductor 59 to the circuitry of FIG. 3 via conductor 62. As explained hereinafter, the latter signals are produced when the voltages on conductors 35 and 59 are changed as a result of a variation in the transducer resistance 43 during an airflow measurement.

Transducer resistance 43 has a finite temperature coefficient that is unidirectional positive or negative over the resistance range of interest. In addition, it may selectively have a linear or nonlinear characteristic of temperature versus ohmic resistance. In the exemplary embodiment, the transducer resistance 43 is a platinum wire having a finite temperature coefficient that is positive and a substantially linear characteristic of temperature versus ohmic resistance. A steady state DC current flows through the platinum wire to elevate its temperature and thereby establish its operational resistance 43. The current flows from the negative potential on conductor 36 through the resistance 43, resistor 41 to the positive potential on conductor 35. The platinum wire is mounted in the airflow path through transducer 44. In the absence of an airflow through the transducer 44, the resistance 43 has a prescribed ohmic value and the rheostat 40 is adjusted to calibrate the measurement bridge 3 so that the meter 71 of FIG. 3 indicates a magnitude corresponding to a zero gas flow through transducer 44 as later explained. The flow of an air to be measured through the transducer 44 appropriately cools the platinum wire and thereby lowers its resistance 43. As a result, the current through resistance 43 increases with a resultant decrease in the current through potentiometer 42. The latter current alters the base bias on transistor 38, the collector output of which, in turn, changes the bias on transistors 29 and 30 so that the voltage on lead 35 is increased to the extent that the voltage across resistance 43 remains at the aforementioned constant value. Advantageously, the increased voltage on conductor 35 is reflected as an increased voltage on conductor 59 which is substantially reproduced at emitter 66 for application over conductor 62 to the circuitry of FIG. 3 as a signal indicating the magnitude of airflow through transducer 44. The resistance 43 varies in accordance with the airflow through transducer 44 and enables instantaneous airflows to be translated by the measurement bridge 3 and circuitry of FIG. 3 into direct indications on the meter 71 of FIG. 3.

In FIG. 3, the peak detector network 7 and linearizing network 8 both receive the output voltage from the measurement bridge 3 over the lead 62. A capacitor 72 is included in network 7 for charging through diode 73 to the peak, or highest, voltage applied to lead 62 by the measurement bridge 3. Diode 73 is unidirectional and substantially blocks a stored voltage on capacitor 72 from being undesirably discharged. The stored voltage is connected from capacitor 72 through break contact 74 of key 75 over conductor 76 to bank terminal 77 of selector switch 78 from which it is extendable via its wiper 79 and lead 80 to the meter circuit 11 for translation into a flow indication on meter 71. For calibrating meter circuit 11 to measure peak flow, the wipers 79 and 81 of switch 78 are switched to its terminals 77 and 82 and then key 75 is actuated momentarily to open its contact 74 and to close its contacts 83 whereby capacitor 72 is discharged preparatory to a peak flow measurement. Upon the release of key 75, capacitor 72 remains uncharged because the voltage on conductor 62 is zero for signifying a zero flow through transducer 44. A known airflow is then admitted into transducer 44 for unbalancing bridge 3 and producing an output voltage on conductor 62 corresponding to the known airflow. Capacitor 72 charges to this voltage and it is coupled over the previously traced circuit to conductor 80 at the input of meter circuit 11. Rheostat 84 in meter circuit 11 is then adjusted until a flow indication is depicted on meter 71 corresponding to the known airflow. Thereafter, the known input airflow is removed from transducer 44 and key 75 is reactuatable at the beginning of a new flow measurement momentarily to open its contacts 74 and to close its contacts 83 whereby capacitor 72 is discharged and is prepared for storing the peak voltage corresponding to the peak flow subsequently measured by bridge 3.

The measurement signals applied by the bridge 3 over lead 62 to linearizing network 8 are nonlinear with respect to the airflow through transducer 44. Graphic curve A of FIG. 6 depicts an exemplary bridge voltage output versus airflow through transducer 44. Linearizing network 8 is utilized to convert the bridge 3 output on lead 62 into an output voltage across potentiometer 85 which is linear with respect to airflow through transducer 44. FIG. 6 illustrates an output response of network 8 by curve B and the achieved linear relationship between the network 8 output and airflow by the dashed line C.

Network 8 is a diode-resistor arrangement which enables its output voltage across potentiometer 85 to increase more rapidly than increases in the input voltage on lead 62. That is, network 8 offers an impedance which decreases as the input voltage on lead 62 increases to convert the input voltage into a linearized voltage with airflow through transducer 44. Such a voltage conversion is achieved by enabling the diodes 86—86n to conduct successively through their nonlinear voltage range (0 to 0.6 volts, for example) into their fixed voltage state (0.6 volts, for example) through the resistors 87—87n in accordance with the magnitude of the input voltage on lead 62. As a result, the effective resistance of network 8 in series with lead 62 and potentiometer 85 decreases within the operational range of interest as the magnitude of the input voltage increases and whereby the voltage across potentiometer 85 accordingly increases providing a linear relationship between the voltage across potentiometer 85 and airflow through transducer 44.

In FIG. 3, the multiple timed volume signal storage and sequence circuit 13 translates into volume signals the linearized airflow voltages developed across potentiometer 85 within 1, 2 and 15 second intervals of a measurement cycle. An integration amplifier 88 receives the linearized flow voltages from wiper 92 via brake contact 173 of relay 172 and cooperates with the storage capacitors 89, 90 and 91 to perform the latter flow to volume translation. Volume is the integral of flow. The input voltage to amplifier 88 derived from the wiper 92 of potentiometer 85 via contact 173 is amplified and used to charge the capacitors 89, 90 and 91 via contacts 93, 94 and 95 of relays 96, 97 and 98 to ground for 1, 2 and 15 seconds of a breath cycle, respectively. Relays 96, 97 and 98 form a sequence circuit and are operated under control of pulses received from a pulse generator 99 for successively disconnecting the charged capacitors 89, 90 and 91 from the amplifier 88 output lead 100 and connecting them via contacts 101, 102 and 103 to the respective bank terminals 104, 105 and 106 of selector switch 78. Generator 99 successively generates 1, 2 and 15 second interval pulses on the leads 107 and 108 after the closure of contact 109 upon the start of a breath cycle.

The operation of circuit 13 is initiated after contact 110 of key 75 is momentarily closed for discharging capacitors 89—91 via resistor 111 and contacts 93—95 to ground prior to the start of a breath cycle. Upon the start of a breath cycle (zero time), contact 110 opens and the capacitors 89, 90 and 91 begin to charge to the output voltage of amplifier 88. In addition, another switch contact 109 is concurrently actuated and closed for energizing pulse generator 99 to produce successive pulses between leads 107 and 108 at the end of 1, 2 and 15 second intervals for operating the relays 96—98. The 1-second pulse operates relay 96 over the path from lead 107 through the 96 relay winding and its break contact 112 to lead 108. In operating, relay 96 locks via its contact 113 to a potential on lead 114. Operated relay 96 also opens its contact 93 to disconnect the charged capacitor 89 from the amplifier output lead 100 and to connect it via contact 101 and lead 115 to terminal 104 of switch 78. Thereafter, capacitor 89 remains substantially charged to a voltage representing the volume of the airflow through the transducer 44 within a 1-second interval until discharged upon recycling by the momentary actuation of contact 110. Capacitor 89 is subsequently connected through switch wiper 79 and lead 80 to meter circuit 11. The operation of relay 96 also closes its contact 116 for steering the 2-second pulse from lead 108 to the 97 relay winding via its contact 117.

Upon receipt of the 2-second pulse, relay 97 operates and then locks via its contact 118 to the potential on lead 114. The operation of relay 96 also opens its contact 94 to disconnect the charged capacitor 90 from the amplifier output lead 100 and connects it via its contact 102 and lead 119 to terminal 105 of switch 78. Capacitor 90 then remains charged to the voltage corresponding to the volume of airflow through transducer 44 within the 2-second interval until subsequently discharged upon recycling by the momentary actuation of contact 110. Capacitor 90 is subsequently connected through the switch wiper 79 and lead 80 to meter circuit 11. Operated relay 97 also closes its contact 120 to steer the 15-second interval pulse from generator 99 over lead 108 through contact 116 to the 98 relay winding via its contact 121. In addition, the operation of relay 97 closes its contact 122 for signaling generator 99 over leads 123 and 124 to change its timing interval so that the next pulse is generated at 15 seconds from the start of the breathing cycle.

The 15-second pulse operates relay 98 which then locks via its contact 125 to the potential on lead 114. Upon operating, relay 98 opens its contact 95 to disconnect the charged capacitor 91 from the amplifier output lead 100 and to connect it via contact 103 and lead 126 to terminal 106 of switch 78. Capacitor 91 retains the charge of the voltage corresponding to the volume of airflow through transducer 44 within the 15-second interval until it is discharged upon recycling by the momentary actuation of contact 110. Capacitor 91 is subsequently connected to meter circuit 11 via switch wiper 79 and lead 80.

As a result of the foregoing operations, the storage and sequence circuit 13 registers a plurality of distinct voltage signals on the capacitors 89—91 during the 1, 2 and 15-second intervals of a breathing cycle. The latter signals together with the peak voltage detected during the 15-second interval and stored on capacitor 72 may be selectively connected to meter circuit 11 for translation into volume and percentage indications on meter 71.

Selector switch 78 comprises the ganged wipers 79 and 81 which are selectively movable into contact with the respective banks of terminals 77, 104—106 and 82, 127—129 both connecting the individual capacitors 72, 89, 90 and 91 to meter circuit 11 and establishing meter circuit configurations utilized for selectively translating the stored signals into volume indications on meter 71.

Meter circuit 11 comprises field effect transistors 130 and 131 and a meter 71 together with related circuitry for converting airflow and volume voltages into flow and volume indications on meter 71. Transistors 130 and 131 have their drain electrodes 132 and 133 connected to the regulated output voltage on lead 35. The gate electrode 134 of transistor 130 is selectively connected through a break contact 171 of relay 172 over lead 80 to wiper 79 and advantageously provides a high input impedance for receiving the voltages stored on capacitors 72 and 89—91 and substantially without discharging the capacitors. The latter characteristic enables meter circuit 11 to be repeatedly switched to the different charged capacitors and to supply steady state indications on meter 71. Transistor 131 has its gate electrode 135 connected to ground. The supply electrodes 136 and 137 of transistors 130 and 131 are biased through respective resistors 138 and 139 and the balancing potentiometer 140 by a voltage applied to its wiper 141 via lead 36. Accordingly, transistors 130 and 131 are operable to supply potential differences at the respective supply electrodes 136 and 137 under control of the voltages stored on capacitors 72 and 89—91 and supplied to the gate electrode 134. To convert these potential differences into peak flow and volume indications, the meter 71 is selectively connectable between the supply electrodes 136 and 137 via wiper 81 and its terminals 82 and 127—129 as well as rheostats 84 and 142 and break contact 174 of relay 172.

When wiper 81 is switched into contact with terminal 82, meter 71 is connected through contact 174, wiper 81 and terminal 82 in series with the peak flow calibration rheostat 84 to the supply electrode 137. In addition, wiper 79 is gang switched into contact with terminal 77 whereby the detected peak voltage stored on capacitor 72 is applied via break contact 171 of relay 172 to the gate electrode 134 for biasing transistor 130 so that the potential difference between supply electrodes 136 and 137 represents the detected peak voltage. The latter is then applied to meter 71 via contact 174, wiper 81, terminal 82 and rheostat 84 for energizing meter 71 to indicate the measured peak airflow through transducer 44.

Meter 71 is selectively connectable between the supply electrodes 137 and 137 via another calibration rheostat 142 via the terminals 127—129 and contact 174 of relay 172 for translating the stored voltages on capacitors 89—91 into indications of the measured volumes of exhaled breath through transducer 44 during the 1, 2 and 15 second intervals. When wiper 79 is in contact with terminal 104, 105 or 106, the voltage on the capacitor 89, 90 or 91 for the respective 1, 2 or 15 second interval is applied via contact 171 to gate electrode 134 for biasing transistor 130 so that the potential difference between supply electrodes 136 and 137 represents the measured volume of airflow through transducer 44 during the corresponding interval.

Rheostat 142a is included in the meter circuit 11 for percentage calibration meter 71. The meter indication provided for the 15-second interval measurement may be adjusted by rheostat 142a to be a full scale indication corresponding to 100 percent of the exhaled airflow through transducer 44 by extending the 15-second reading to the full scale (100 percent) position. Rheostat 142a is selectively connectable in parallel with rheostat 142 via contact 142b of the locking key for the percentage calibration and measurements. Contact 142b is actuatable to open circuit rheostat 142a when percentage readings are not desired on meter 71. Accordingly, when rheostat 142a is connected in parallel with rheostat 142 the meter 71 indications obtained, as previously explained, for the 1 and 2 second intervals express percentages of the maximum total volume exhaled at the end of 1 and 2-second intervals.

The foregoing structure measures the vital capacity, forced vital capacity, forced expiratory volume and forced expiratory volume percentages for a breathing cycle including the time from 0 to 1, 2 and 15 seconds as well as the peak flow over the 15-second interval.

The spirometer equipment further provides for the measurement of minute volume which is the gas or breathed air volume expired or inspired during one minute. It is basically a flow measurement. To effect such a measurement, the multiple timed volume storage and sequence circuit 13 is disconnected from meter circuit 11 at contact 171 and from the linearizing network 8 at contact 173 when relay 172 of FIG. 3 is operated. Relay 172 operates upon the closure of the locking key contact 175 which completes the circuit through the relay winding to the potentials on leads 35 and 36. In operating, relay 172 opens its contact 174 to disconnect meter 71 from the selector switch wiper 81 and closes its contact 176 to connect meter 71 in series with the minute volume meter calibration rheostat 177 and between the supply electrodes 136 and 137. The operation of relay 172 also connects the output of the linearizing network 8 via its contacts 178 and a long time constant arrangement of rheostat 179, resistor 180 and capacitor 181 to the gate electrode 134 via contact 182 of relay 172. Operated relay 172 also connects capacitor 181 to ground via contact 183. As a result, capacitor 181 charges toward the linearized output voltage of the network 8 over the path including contact 183, resistor 180, rheostat 179 and contact 178. In charging, capacitor 181 stores the average value of the network 8 output voltage signals. The voltage thus stored is applied via contact 182 of relay 172 to gate electrode 134 for biasing transistor 130 so that the potential difference between the source, or supply, electrodes 136 and 137 represents the measured minute volume of airflow through transducer 44 during the breathing cycle.

The spirometer also includes timing and alarm circuits 184 and 185 in FIG. 3 which are energized upon the closure of contact 186 when relay 172 is operated as previously described. The timing circuit 184 monitors the linearized output signals from network 8 and is responsive to the absence of a prescribed output voltage at wiper 92 for initiating a timing operation. If the prescribed voltage thereafter is detected by circuit 184 before the expiration of a predetermined timed interval, its cancels the timing operation. When the timed interval expires without detecting the prescribed network 8 output voltage, circuit 184 activates the alarm circuit 185 immediately to indicate that a breathing or equipment defect is present.

Turning now to FIGS. 5A—5D, the airflow transducer 44 comprises two separable, complementary and hollow cylindrical plastic bodies 143 and 144 each of which tapers into a contiguous elongated sleeve extension element 145 and 146, respectively. As shown in FIG. 5B, body 143 comprises an outer cylinder wall 147 having a diameter smaller than the inner cylinder wall 148 of body 144 for facilitating a substantially airtight complementary and overlap interfitting of bodies 143 and 144. The extension element 146 forms a mouthpiece for admitting airflow to be measured through the aperture defined by the inner cylinder wall 148.

FIG. 5B shows an inner cylinder wall 149 of the body 143 and its extension element 145. Within wall 149 of body 143, a structure is housed for supporting and positioning the platinum wire resistance 43 perpendicular the the airflow to be measured. The structure includes a subassembly, as shown in FIGS. 5B and 5C, having a V-shaped platinum wire resistance 43 affixed (for example, by soldering) to three copper plates 150, 151 and 152 which are secured to a flat surface 153 of a plastic ring member 154. The latter includes a circular inner wall 155 defining an aperture for enabling air to flow past the wire resistance 43. Wires 156 and 157 are connected respectively to plates 151 and 152 and are extended through respective apertures in body 143 for connecting the wire resistance 43 into the measurement bridge 3 of FIG. 2. The latter apertures extend through a dome shoulder extension 158 on the outer wall 147 of body 143.

In FIG. 5B, a pair of hollow tubular-shaped devices 159 and 160 form another part of the structure supporting and positioning the wire resistance within the inner wall 149 of body 143. Devices 159 and 160 each comprise respective wall members 161 and 162 defining an inner axial bore, as well as respective flat side surfaces 163, 164, 165 and 170. The outer wall members 166 and 167 of devices 159 and 160 are substantially equal in diameter and the same as the outer diameter of ring 154 and which diameter is smaller than the inner diameter defined by wall 149 of body 143. Ring 154 of the wire resistance 43 subassembly is sandwiched between the side surfaces 163 and 164 of tubular devices 159 and 160 as shown in FIG. 5B for positioning the wire resistance 43 within the inner wall 149 of body 143 perpendicular to the flow of air to be measured. Screens 168 and 169 are attached to the respective side surfaces 170 and 165 of tubular devices 159 and 160.

Accordingly, measurements of a plurality of respiratory parameters of a patient are accomplished by having the patient insert the mouthpiece extension element 146 of transducer 44 into his mouth. He then expels air to be measured through the passageway in transducer 44 including the aperture defined by wall 148, screen 169, the bore defined by wall 162, past wire resistance 43, the aperture in ring 154 defined by its inner wall 155, the bore defined by wall 161, screen 168, and the aperture defined by wall 149 to the exhaust opening of extension element 145. The air thus flowing cools the electrically heated platinum wire for lowering its resistance 43 and thereby activating the measurement bridge 3 and voltage regulator 1 of FIG. 2 as previously explained to produce bridge output voltages which are applied to the peak detector and linearizing networks 7 and 8 of FIG. 3. As described hereinbefore, the peak detector network 7 detects the peak, or maximum, airflow and network 8 translates the nonlinear bridge output voltages into linear voltages with respect to expelled airflow.

The linearized output voltages of network 8 are selectively connectable through the resistance-capacitor averaging network to meter circuit 11 for effecting indications on meter 71 of the minute volume of airflow through transducer 44. In addition, the volumes and percentages of airflow through transducer 44 within 1, 2 and 15 timed intervals of a 15-second measurement cycle may be measured and indicated as follows: Concurrent with the start of a patient's expelled breath, the pulse generator 99 of FIG. 3 is selectively operative to generate 1, 2 and 15 second pulses, as already explained, for controlling relays 96, 97 and 98 whereby the capacitors 89, 90 and 91 are charged to the respective linearized voltages from network 8 corresponding to the volumes of air expelled by the patient within the 1, 2, and 15 second intervals. The charged capacitors 72 of network 7 and 89—91 of circuit 13 are thereafter selectively connected via the selector switch 78 to the meter circuit 11 for indicating as already stated the following respiratory parameters:

TIDAL VOLUME
The volume of air expired during a single respiratory cycle of normal breathing (unit of measure in liters).

VITAL CAPACITY
The maximum air volume expelled by a patient after a maximum inspiration (unit of measure in liters).

FORCED VITAL CAPACITY
The air volume expired after a maximum inspiration with the expiration being as forceful and as rapid as possible (unit of measure in liters). 15seconds period is deemed sufficient for this measurement.

FORCED TIMED EXPIRATORY VOLUME
The volume of air expired over a given time interval from time zero to a forced vital capacity effort to a time equal 1, 2, or 15 seconds (unit of measure in liters).

PEAK FLOW
The maximum flow during a forced vital capacity effort (unit of measure in liters per minute).

FORCED EXPIRATORY PERCENTAGE
The ratio expressed in percentage of forced time expiratory volume in 1 and 2 second intervals to the forced vital capacity.

The storage capacitors 89—91 and the associated circuitry measure and store the voltages corresponding to the foregoing parameters in the 1, 2 and 15 second intervals of a 15-second measurement cycle and meter circuit 11 displays the measured units on meter 71. It is evident that the latter intervals are merely illustrative and that it is within the scope of this invention to provide additional measurement intervals by furnishing additional relays in the sequence circuitry with contact configurations which are operated by additional timing pulses from the pulse generator 99 for charging additional capacitors within the prescribed additional intervals and thereafter connecting these charged capacitors to the selector switch 78 for selective application to meter circuit 11 which displays the measured parameters. In addition, the voltages stored on the capacitors 89—91, as well as all of the individual circuit outputs such as the output of the integrator amplifier 88, may be selectively connected to recorder apparatus (not shown) for producing printed or graphic displays of the measured parameters.

Moreover, a plurality of peak detector networks may be provided for each of the 1, 2 and 15 second intervals and each such detector may be controlled by additional contacts (not shown) on the respective relays 96, 97 and 98 to detect and store the peak airflow signals occurring in each of the 1, 2 and 15 second intervals. Each of such stored peak signals may then be selectively connected to switch 78 terminals (not shown) for connection to meter circuit 11 for conversion into respective indications on meter 71 of the peak airflow in the respective 1, 2 and 15 second interval.

Furthermore, the timing and alarm circuits 184 and 185 may be operative for monitoring airflow during the multiple timed volume measurements and for detecting undesired impairments of such airflow or measurements. In addition, the disposal mouthpiece housing 144 and 146 of the transducer as shown in FIG. 5 may be constructed of plastic, metal or paper composition.

It is to be understood that the hereinbefore described arrangements are illustrative of the application of the principles of this invention. Numerous other arrangements may be devised by those skilled in the art without departing from the spirit and scope of the invention.

We claim:
1. Measuring equipment comprising:
 a transducer having an electrical resistance element operating at a prescribed temperature to produce a desired elec- trical resistance for said element and being responsive to the flow of gas therethrough for altering said temperature to change said resistance of said element, apparatus responsive to the resistances of said element for translating said resistances into output signals representing gas flow, said output signals being nonlinear with respect to said gas flow through said transducer, and means connectable to said apparatus for selectively converting said output signals into signal indications of the magnitude of said gas flow through said transducer and including means altering said signal indications into linear signal indications of the magnitude of gas flow through said transducer.

2. Measuring equipment in accordance with claim 1 wherein said converting means further includes means averaging said linearized signal indications for supplying electrical signals representing minute magnitude of gas flow through said transducer.

3. Equipment for measuring airflow comprising:
a measurement bridge including a transducer having an electrical resistance element,
a voltage source applying operating voltages to said bridge and resistance element,
said element being heated by the applied voltage to produce a prescribed reference resistance,
means controlled by the resistance of said element for regulating the operating voltage applied to said bridge for maintaining a constant applied voltage to said element for heating thereof,
said element being responsive to the flow of air through said transducer for altering the prescribed resistance of said element to control said regulating means for changing the applied voltage to said bridge, and
apparatus responsive to the voltages applied to said bridge for indicating the magnitude of the airflow through said transducer.

4. Equipment for measuring airflow in accordance with claim 3 wherein said indicating apparatus comprises:
a meter circuit operable for supplying indications of volumes of airflow through said transducer, and
a resistance and capacitance arrangement controlled by the voltages applied to said bridge for operating said meter circuit to supply indications of the minute volumes of airflow through said transducer.

5. In combination:
means responsive to airflow within a prescribed time period for producing electrical signals representing the magnitudes of said airflow,
control means including means providing a plurality of discrete intervals within said time period and means controlled by said providing means for translating the produced electrical signals into voltages representing the volumes of said airflow within each of said plurality of discrete intervals, and
means selectively responsive to each of said voltages for indicating the volume of said airflow within each of said discrete intervals.

6. The combination in accordance with claim 5 wherein said control means further includes:
an electrical network means responsive to the produced electrical signals for storing a voltage corresponding to the peak magnitude of said airflow, and
said indicating means being controllable by the stored voltage for indicating said peak magnitude of said airflow.

7. The combination in accordance with claim 5 wherein said control means further includes:
a plurality of storage devices connectable to said translating means for storing individual voltages on each of said devices representing the volume of airflow within one of said discrete intervals, and
means operative for controlling the sequential connection of each of said devices to said translating means.

8. The combination in accordance with claim 5 wherein said translating means includes:
an electrical network responsive to the receipt of the produced airflow electrical signals for supplying output electrical signals having a linear response relationship with respect to said airflow,
an amplifier device for integrating the airflow electrical signals to produce the air volume voltages, and
said amplifier device is responsive to said output electrical signals for producing said air volume signals.

9. The combination in accordance with claim 5 wherein said producing means comprises a transducer having:
two separable, complementary interfitting and hollow cylindrical bodies,
one of said bodies s having and extension element forming a mouthpiece for admitting air to be measured through said one hollow body,
the other of said bodies having means defining an exhaust aperture for exhausting air admitted in said hollow other body,
a platinum wire resistance,
means supporting said wire resistance including a plurality of electrically conductive plates secured to said wire resistance and connectable to said electrical circuit,
a pair of hollow cylindrical devices each having an axial bore and being within said other hollow body positioning said supporting means with said wire resistance substantially perpendicular to the path of airflow,
said supporting means having means defining an aperture for enabling air admitted into said one hollow body to pass through said other hollow body and said axial bores to said exhaust aperture,
a first screen member positioned within said one hollow body about said mouthpiece, and
a second screen member positioned within said other hollow body between said exhaust aperture and said supported wire resistance.

10. A spirometer comprising:
a transducer responsive to the receipt of airflow for producing electrical conditions representing the magnitude of said airflow,
apparatus responsive to the produced electrical conditions for translating said conditions into output signals corresponding to said airflow magnitudes,
a plurality of storage devices connectable to said apparatus for storing said output signals,
sequence means sequentially controlling the connection of said devices to said apparatus at prescribed time intervals for storing discrete ones of said output signals on each of said devices, and
means selectively connectable to each one of said devices for converting the signal stored on said one device into an indication of the magnitudes of said air volume and said airflow through said transducer during one of said prescribed intervals.

11. A spirometer in accordance with claim 10 wherein:
said transducer comprises an electrical resistance element which is responsive to airflow through said transducer for producing predetermined electrical resistances representing the magnitudes of said airflow, and
said apparatus comprises translating means responsive to produced electrical resistances for supplying predetermined output signals corresponding to each of said airflow magnitudes.

12. A spirometer in accordance with claim 11 wherein:
said translating means includes a resistive measurement bridge and said electrical resistance element is connected in said bridge, and
a voltage source applying operating voltages to said bridge including said resistive element, said voltage applied to said element effecting a current flow therethrough for heating said element to produce a predetermined electrical resistance, said resistance element thereafter being responsive to said airflow through said transducer for changing the resistance of said element from said predetermined resistance.

13. A spirometer in accordance with claim 12 wherein:
said voltage source includes a voltage regulator responsive to the resistances of said resistance element for applying voltages to said bridge for maintaining a constant applied voltage to said element for said heating thereof.

14. A spirometer in accordance with claim 13 wherein:
said apparatus further includes amplifier means connected to said measurement bridge and being responsive to said applied voltages for supplying said predetermined output signals corresponding to each of said airflow magnitudes.

15. A spirometer in accordance with claim 14 wherein:
said apparatus further comprises a peak detector network responsive to said predetermined output signals from said amplifier means for storing the one of said signals corresponding to the peak airflow through said transducer.

16. A spirometer in accordance with claim 15 wherein:
said peak detector network comprises a series arrangement of a semiconductor device and a capacitor for storing said one output signal from said amplifier means.

17. A spirometer in accordance with claim 14 wherein:
each of said storage devices includes a storage capacitor, and
said amplifier means includes and amplifier device connected to said measurement bridge and being responsive to said applied voltages from said voltage regulator for producing prescribed output signals, and an electrical network responsive to said prescribed output signals for supplying said predetermined output signals for storage on each of said capacitors.

18. A spirometer in accordance with claim 17 wherein:
said prescribed output signals from said amplifier device have a nonlinear relationship with respect to airflow through said transducer, and
said electrical network includes means for altering said prescribed output signals into network output signals which have a linear relationship with respect to airflow through said transducer.

19. A spirometer in accordance with claim 18 wherein:
said altering electrical network comprises a first diode and a first resistor in series and at least a second diode and a second resistor both connected in parallel with said first resistor and in series with said first diode and said amplifier device.

20. A spirometer in accordance with claim 19 wherein:
said amplifier means further comprises another amplifier device responsive to said network output signals for controlling the storage of said predetermined output signals on each of said storage capacitors corresponding to the volumes of airflow through said transducer.

21. A spirometer in accordance with claim 20 wherein said sequence means includes:
means for producing timing signals each of which corresponds to a prescribed interval during said airflow,
a plurality of switching devices connecting said storage capacitors to said other amplifier device for storing said predetermined output signals and being responsive to said timing signals for successively disconnecting each of said capacitors from said other amplifier device.

22. A spirometer in accordance with claim 21 wherein:
said timing signal producing means comprises means for generating a series of pulses each of which corresponds to an individual prescribed interval during said airflow through said transducer, and each of said switching devices comprises a relay having contacts connecting one of said storage capacitors to said other amplifier device and being responsive to a predetermined one of said pulses from said pulse generator for operating its contacts to disconnect said one storage capacitor from said other amplifier device.

23. A spirometer in accordance with claim 22 wherein:
said converting means includes a meter circuit selectively connected to said storage capacitors for converting the signals stored on each of said capacitors into indications of the volumes of airflow through said transducer during each of said prescribed intervals.

24. A spirometer in accordance with claim 23 wherein said meter circuit comprises:
a meter and transistor circuitry selectively connectable to each of said storage capacitors and being responsive to the signals stored on each of said capacitors for operating said meter to indicate said airflows and volumes through said transducer during said prescribed intervals, and
further including a selector switch controllable for connecting each of said capacitors individually to said transistor circuitry.

25. In combination:
means including a linearizing electrical network responsive to the flow of fluid for producing linear electrical signals with respect to said flow, and
an electrical network arrangement comprising resistor-capacitor means averaging said linear electrical signals for translation into electrical indications of said minute magnitude of said flow.

26. The combination in accordance with claim 25 wherein field-effect transistor circuitry and meter means cooperate for said translation of the averaged linear electrical signals into electrical meter indications of the minute volume of said flow.

27. In combination:
means responsive to the flow of fluid within a prescribed time period for producing electrical signals representing said flow, and
means automatically translating said signals into electrical indications of the volume of said fluid flow with said prescribed time period,
said translating means including:
an electrical linearizing network for converting said electrical signals into linear output signals with respect to flow, and
integrator means responsive to said output signals for deriving volume signal indications within said time period.

28. The combination in accordance with claim 27 wherein said translating means further includes:
means for storing said volume signal indications, and
transistor and meter means responsive to the stored volume signal indications for translating said indications into meter indications of volume.

29. Equipment for measuring fluid flow magnitude per minute comprising:
means responsive to the flow of fluid for producing electrical signals representing said flow,
a linearizing electrical network for translating said electrical signals into linear output signals with respect to said flow,
an averaging electrical network for averaging said linear output signals into electrical signal indications of the flow magnitude per minute, and
means cooperating with said averaging electrical network for translating said last mentioned electrical signals into a display of said flow magnitude per minute.